(12) United States Patent
Itagaki

(10) Patent No.: US 12,736,088 B2
(45) Date of Patent: Sep. 15, 2026

(54) TRIPOD TYPE CONSTANT VELOCITY UNIVERSAL JOINT

(71) Applicant: NTN CORPORATION, Osaka (JP)

(72) Inventor: Taku Itagaki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 280 days.

(21) Appl. No.: 18/685,730

(22) PCT Filed: Aug. 10, 2022

(86) PCT No.: PCT/JP2022/030649
§ 371 (c)(1),
(2) Date: Feb. 22, 2024

(87) PCT Pub. No.: WO2023/032634
PCT Pub. Date: Mar. 9, 2023

(65) Prior Publication Data
US 2025/0146536 A1 May 8, 2025

(30) Foreign Application Priority Data
Sep. 3, 2021 (JP) ................................ 2021-143955

(51) Int. Cl.
*F16D 3/205* (2006.01)

(52) U.S. Cl.
CPC ......... *F16D 3/2055* (2013.01); *Y10S 464/905* (2013.01)

(58) Field of Classification Search
CPC .......................... F16D 3/2055; Y10S 464/905
USPC .......................................................... 464/111
See application file for complete search history.

(56) References Cited

U.S. PATENT DOCUMENTS 6,475,092 B1 11/2002 Kura et al.
6,764,407 B2 * 7/2004 Goto .................... F16D 3/2055 464/111
7,137,895 B2 11/2006 Ishijima et al.
2003/0073501 A1 4/2003 Goto et al.
(Continued)

FOREIGN PATENT DOCUMENTS

JP 2000-320563 11/2000
JP 2003-97589 4/2003
JP 2009-068509 4/2009
(Continued)

OTHER PUBLICATIONS

International Preliminary Report on Patentability and Written Opinion of the International Search Authority issued Mar. 5, 2024 in International (PCT) Application No. PCT/JP2022/030649.
(Continued)

*Primary Examiner* — Greg Binda
(74) *Attorney, Agent, or Firm* — Wenderoth, Lind & Ponack, L.L.P.

(57) ABSTRACT

In a tripod type constant velocity universal joint of a double roller type, a projection 40 is provided in regions including both end portions in a direction orthogonal to a joint axial line O on a shaft end side with respect to an inner ring 12 on an outer peripheral surface of a leg shaft 32 of a tripod member 3. A ratio T/ag1 between a dimension T in a direction of the joint axial line O of the projection 40 and a major diameter ag1 of a contact portion with the inner ring on the outer peripheral surface of the leg shaft 32 is 0.3 or more.

4 Claims, 6 Drawing Sheets

(56) References Cited

U.S. PATENT DOCUMENTS

2010/0022316 A1 1/2010 Yamase

FOREIGN PATENT DOCUMENTS

JP 2020-133859 8/2020
WO 2008/117616 10/2008

OTHER PUBLICATIONS

International Search Report (ISR) issued Nov. 1, 2022 in International (PCT) Application No. PCT/JP2022/030649.

* cited by examiner

TRIPOD TYPE CONSTANT VELOCITY UNIVERSAL JOINT

TECHNICAL FIELD

The present invention relates to a tripod type constant velocity universal joint used for power transmission of automobiles and various industrial machines.

BACKGROUND ART

In a drive shaft used in a power transmission system of an automobile, a plunging type constant velocity universal joint is coupled to an inboard side (a differential side) of an intermediate shaft, and a fixed type constant velocity universal joint is coupled to an outboard side (a wheel side) in many cases. The plunging type constant velocity universal joint herein allows both angular displacement and relative movement in an axial direction between two shafts, and the fixed type constant velocity universal joint allows the angular displacement between two shafts but does not allow the relative movement in the axial direction between the two shafts.

A tripod type constant velocity universal joint is known as a plunging type constant velocity universal joint. As the tripod type constant velocity universal joint, there are a single roller type and a double roller type. In the single roller type, a roller inserted into a track groove of an outer joint member is rotatably attached to a leg shaft of a tripod member via a plurality of needle rollers. The double roller type includes a roller inserted into a track groove of an outer joint member, and an inner ring externally fitted to a leg shaft of a tripod member to rotatably support the roller (for example, see Patent Literature 1 below). The double roller type allows the roller to swing with respect to the leg shaft, and thus, has an advantage that induced thrust (axial force induced by friction between parts inside the joint) and slide resistance can be reduced as compared with the single roller type.

In an assembling process of the tripod type constant velocity universal joint of the double roller type, the inner ring is assembled to the inner periphery of the roller to form a roller unit, and then, the roller unit is externally inserted to the respective leg shafts of the tripod member and assembled to the inner periphery of the outer joint member. A functionally necessary gap is provided between the roller unit and the leg shaft. Therefore, there is a possibility that the roller unit may come off the leg shaft when the roller unit and the tripod member are attached to or detached from the outer joint member or when the drive shaft is attached to or detached from the vehicle for assembly or repair.

In Patent Literature 2 below, a projection 124 is provided at a distal end of a leg shaft 122 of a tripod member 120 in a tripod type constant velocity universal joint of a double roller type having a roller unit 130, which includes a roller 134 and an inner ring 132 as illustrated in FIG. 10. The projection 124 of the leg shaft 122 interferes with the inner ring 132 of the roller unit 130 to prevent the roller unit 130 from coming off the leg shaft 122 at the time of assembly or repair.

CITATIONS LIST

Patent Literature

Patent Literature 1: JP 2000-320563 A
Patent Literature 2: JP 2003-97589 A

SUMMARY OF INVENTION

Technical Problems

Patent Literature 2 described above describes that a come-off preventing function can be exhibited by setting a radial projecting amount (af1−ag1) of the projection and a width h in a leg shaft axial line direction to predetermined values or more. However, if these are set to be too large, it is difficult to incorporate the roller unit into the leg shaft, and thus, there is a limit to improvement of the come-off preventing function achieved by increasing these.

On the other hand, Patent Literature 2 does not mention a width of the projection in a leg shaft circumferential direction. The width of the projection in the leg shaft circumferential direction has been considered so far as follows. That is, in the tripod type constant velocity universal joint of the double roller type, a traverse cross section of an outer peripheral surface of the leg shaft 122 has an elliptical shape as illustrated in FIG. 11, the outer peripheral surface of the leg shaft 122 and the inner ring 132 come into contact with each other in a major axis direction of the leg shaft 122 (a direction orthogonal to a joint axial line), and a gap is provided therebetween in a minor axis direction of the leg shaft 122 (in a joint axial line direction). Therefore, it has been considered that it is sufficient to provide the projections 124 only in regions that come into contact with the inner ring 132, that is, only at both end portions in the major axis direction, of the outer peripheral surface of the distal end of the leg shaft 122, and there is no contribution to the improvement of the come-off preventing function even if a circumferential width (a dimension in the joint axial line direction) of the projection 124 is further increased.

Therefore, an object of the present invention is to improve a function of preventing a roller unit from coming off a leg shaft without deteriorating assemblability between the roller unit and a tripod member in a tripod type constant velocity universal joint of a double roller type.

Solutions to Problems

When a tripod type constant velocity universal joint is assembled or repaired, a roller unit often tilts with respect to a leg shaft of a tripod member when the tripod member and the roller unit are attached to or detached from an outer joint member or when a drive shaft is attached to or detached from a vehicle (see FIG. 8). When the roller unit tilts with respect to the leg shaft in this manner, a gap between an inner peripheral surface of an inner ring of the roller unit and an outer peripheral surface of the leg shaft is apparently reduced (see a chain line in FIG. 7). Therefore, a dimension (circumferential width) of a projection in a joint axial line direction is extended up to a region that is conventionally considered not to interfere with the inner ring, and this region interferes with the inner ring when the roller unit is removed from the leg shaft in the state of tilting with respect to the leg shaft. Since the dimension of the projection in the joint axial line direction is increased in consideration of the tilting states of the roller unit and the leg shaft at the time of assembly or repair, or at the time of attaching or detaching the drive shaft to or from the vehicle as described above, an interference region between the projection and the inner ring increases, and a function of preventing the roller unit from coming off the leg shaft is enhanced.

Meanwhile, when the roller unit is assembled to the leg shaft, only a circumferential central portion (maximum diameter portion) of the projection provided on the leg shaft interferes with the inner ring since the inner ring and the leg shaft are disposed coaxially. Therefore, a pushing force at the time of assembling the roller unit to the leg shaft is the same as a conventional one, and the assembly is not difficult.

The present invention made based on the above findings provides a tripod type constant velocity universal joint including: an outer joint member in which track grooves extending in an axial direction are formed at three locations in a circumferential direction; a tripod member which have three leg shafts projecting in a radial direction; and a roller unit rotatably supported by each of the leg shafts and accommodated in each of the track grooves, the roller unit including a roller, and an inner ring that is externally fitted to the leg shaft and rotatably supports the roller, the inner ring having an inner peripheral surface formed as a convex curved surface in which an intermediate portion in an axial line direction of the inner ring projects toward an inner diameter side, the inner peripheral surface of the inner ring coming into contact with an outer peripheral surface of the leg shaft in a direction orthogonal to a joint axial line and forming a gap against the outer peripheral surface of the leg shaft in a direction of the joint axial line, the tripod type constant velocity universal joint in which a projection is provided in regions including both end portions in a direction orthogonal to the joint axial line on a shaft end side with respect to the inner ring on the outer peripheral surface of the leg shaft, and a ratio T/ag1 between a dimension T of the projection in the direction of the joint axial line and a dimension ag1 of the outer peripheral surface of the leg shaft in the direction orthogonal to the joint axial line is 0.3 or more.

In the above-described tripod type constant velocity universal joint, when a ground surface is provided in a region including both end portions in the direction orthogonal to the joint axial line on the outer peripheral surface of the leg shaft, the projection can be formed simultaneously with grinding of the ground surface. In this case, the projection is provided in the entire ground surface in the joint axial line direction.

In the above-described tripod type constant velocity universal joint, a projecting amount of the projection is preferably 0.015 to 0.15 mm in the entire area of the projection in the joint axial line direction. Further, a width of the projection in a leg shaft axial line direction is preferably 0.1 to 0.5 mm in the entire area of the projection in the joint axial line direction.

Advantageous Effects of Invention

As described above, according to the present invention, it is possible to improve a function of preventing the roller unit from coming off the leg shaft without deteriorating assemblability between the roller unit and the tripod member in the tripod type constant velocity universal joint of the double roller type.

DESCRIPTION OF EMBODIMENT

An embodiment of the present invention will be described with reference to the drawings.

Figure 1:
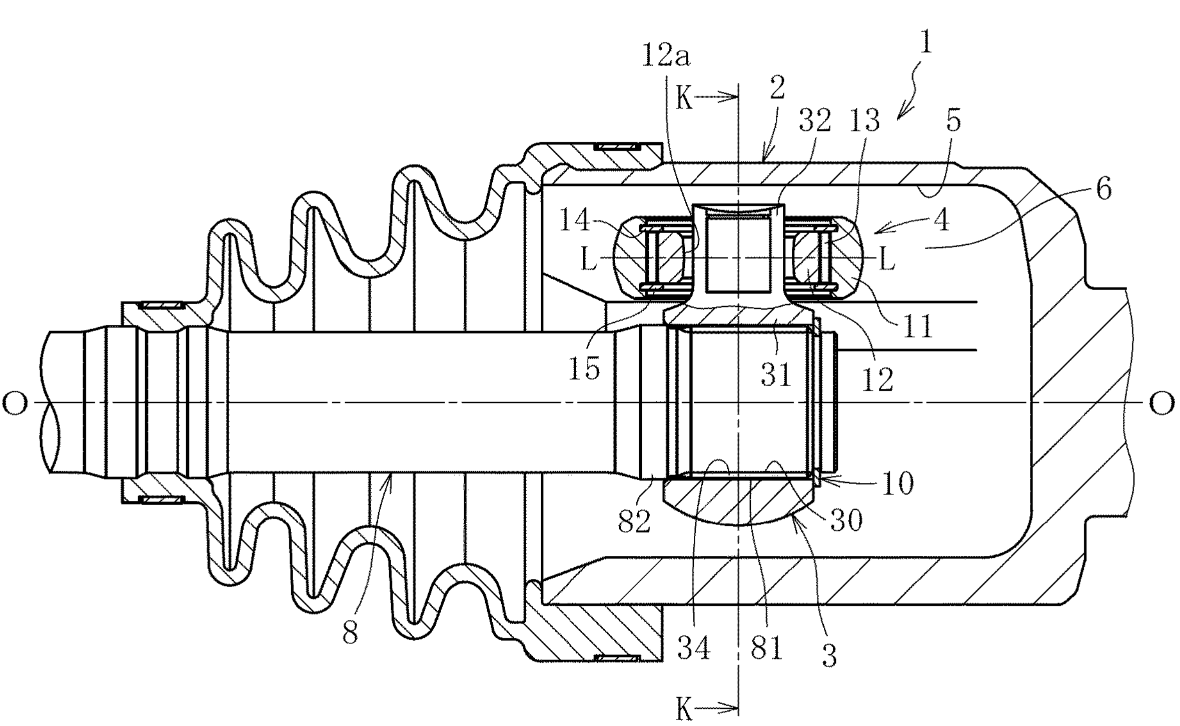
FIG. 1 is a cross-sectional view of a tripod type constant velocity universal joint according to an embodiment of the present invention.
Figure 2:
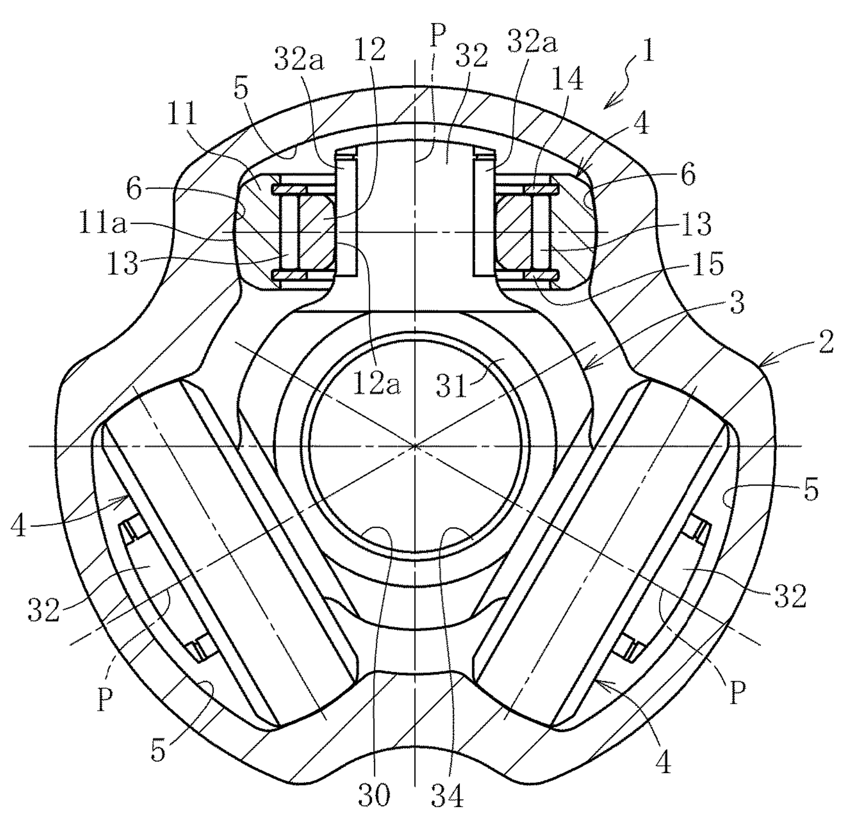
FIG. 2 is a cross-sectional view taken along line K-K in FIG. 1.

The tripod type constant velocity universal joint 1 according to the embodiment of the present invention is a double roller type. As illustrated in FIGS. 1 and 2, the tripod type constant velocity universal joint 1 has a main part including an outer joint member 2, a tripod member 3, and a roller unit 4 as a torque transmitting member.

The outer joint member 2 has a cup shape whose one end is open, and includes three linear track grooves 5 extending in an axial direction and formed on an inner peripheral surface at equal intervals in a circumferential direction. In each of the track grooves 5, roller guide surfaces 6 extending in the axial direction of the outer joint member 2 are formed to face each other in the circumferential direction of the outer joint member 2. The tripod member 3 and the roller unit 4 are accommodated inside the outer joint member 2.

The tripod member 3 integrally includes a body portion 31 having a central hole 30 and three leg shafts 32 projecting in the radial direction from trisection positions in the circumferential direction of the body portion 31. The tripod member 3 is coupled to a shaft 8 as an axis, by fitting a male spline 81 formed on the shaft 8 to a female spline 34 formed in the central hole 30 of the body portion 31 such that a torque can be transmitted. One end surface of the tripod member 3 is engaged with a shoulder portion 82 provided on the shaft 8, and a retaining ring 10 mounted on a distal end of the shaft 8 is engaged with another end surface of the tripod member 3, whereby the tripod member 3 is fixed to the shaft 8 in the axial direction.

The roller unit 4 includes a roller 11 and an annular inner ring 12 disposed on the inner periphery of the roller 11 and externally fitted to the leg shaft 32, and is accommodated in the track groove 5 of the outer joint member 2. The roller 11 is rotatably supported by the inner ring 12. In the illustrated example, the roller 11 and the inner ring 12 are relatively rotatable via a large number of needle rollers 13 interposed therebetween. The roller unit 4 including the inner ring 12, the needle rollers 13, and the roller 11 has a structure that is not separated due to the presence of washers 14 and 15.

In this embodiment, an outer peripheral surface of the roller 11 is a convex curved surface with an arc having a center of curvature on an axial line of the leg shaft 32 as a generatrix. The roller 11 is movable in a direction of a joint axial line O along the roller guide surface 6. The outer peripheral surface of the roller 11 is in angular contact with the roller guide surface 6.

The needle rollers 13 are arranged between a cylindrical inner peripheral surface of the roller 11 as an outer raceway surface and a cylindrical outer peripheral surface of the inner ring 12 as an inner raceway surface, and can freely roll between the outer raceway surface and the inner raceway surface.

Figure 3:
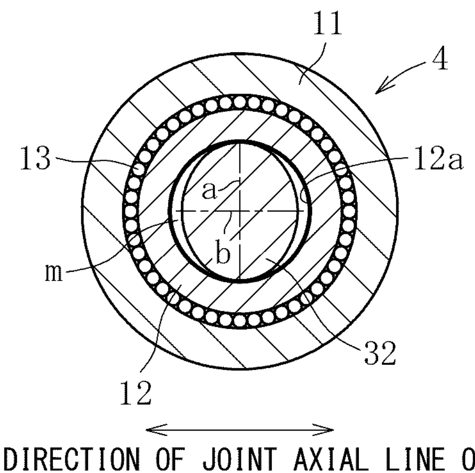
FIG. 3 is a cross-sectional view taken along line L-L in FIG. 1.

An outer peripheral surface of each of the leg shafts 32 of the tripod member 3 has a linear shape parallel to an axial line P of the leg shaft 32 in any longitudinal section including the axial line P. Further, the outer peripheral surface of the leg shaft 32 has a substantially elliptical shape in a transverse cross section orthogonal to the axial line P of the leg shaft 32 as illustrated in FIG. 3. The outer peripheral surface of the leg shaft 32 is in contact with an inner peripheral surface 12*a* of the inner ring 12 in a direction orthogonal to the joint axial line O, that is, in a direction of a major axis a. Specifically, a slight gap for assembling the outer peripheral surface of the leg shaft 32 and the inner peripheral surface 12*a* of the inner ring 12 is provided therebetween in a direction orthogonal to the joint axial line O. On the other hand, in the joint axial line O direction, that is, in a direction of a minor axis b, the outer peripheral surface of the leg shaft 32 is not in contact with the inner peripheral surface 12*a* of the inner ring 12, and a gap m much larger than the gap in the direction orthogonal to the joint axial line O direction is formed therebetween.

Figure 4:
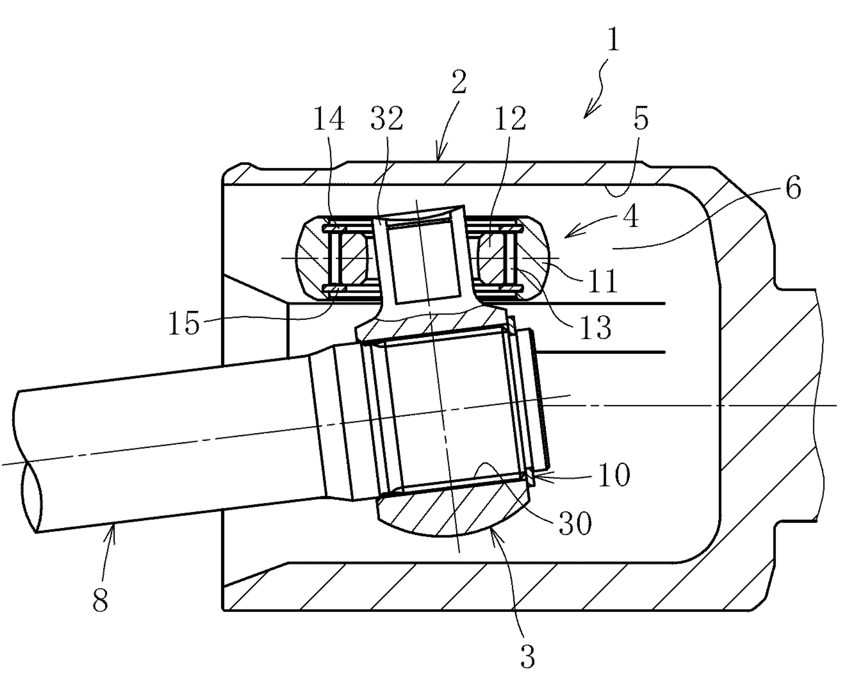
FIG. 4 is a cross-sectional view illustrating a state in which the constant velocity universal joint in FIG. 1 is at an operating angle.
Figure 5:
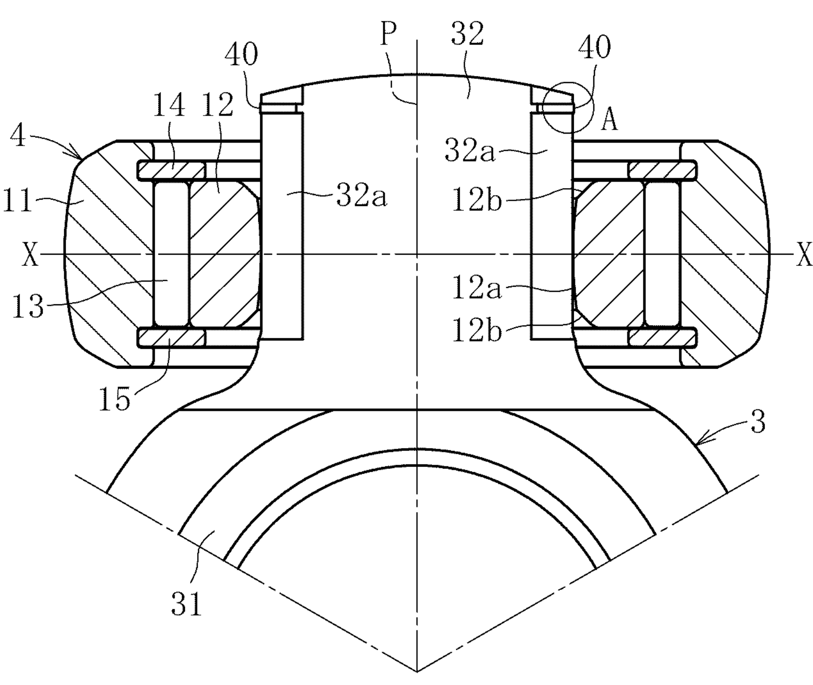
FIG. 5 is an enlarged view of FIG. 2.

The inner peripheral surface 12*a* of the inner ring 12 has a convex curved surface in which an intermediate portion of the inner ring 12 in a direction of the axial line P projects toward an inner diameter side (see FIG. 5). In the illustrated example, the inner peripheral surface 12*a* of the inner ring 12 is formed of a convex curved surface having an arc-shaped cross section, and tapered surfaces 12*b* are provided on both sides in the axial line P direction. Since the convex curved surface is provided as the inner peripheral surface 12*a* of the inner ring 12, the cross-sectional shape of the leg shaft 32 is substantially elliptical as described above, and the gap m in the joint axial line O direction is provided between the leg shaft 32 and the inner ring 12, the inner ring 12 can swing with respect to the leg shaft 32. Since the inner ring 12 and the roller 11 are assembled to be relatively rotatable via the needle rollers 13 as described above, the roller 11 can swing with respect to the leg shaft 32 integrally with the inner ring 12. That is, in a plane including the axial line of the leg shaft 32, the axial lines of the roller 11 and the inner ring 12 can tilt with respect to the axial line of the leg shaft 32 (see FIG. 4).

As illustrated in FIG. 4, when the tripod type constant velocity universal joint 1 rotates at the operating angle, the axial line of the tripod member 3 tilts with respect to the axial line of the outer joint member 2. However, since the roller unit 4 can swing, it is possible to avoid a state in which the roller 11 and the roller guide surface 6 obliquely cross each other. Thus, the roller 11 rolls horizontally with respect to the roller guide surface 6, induced thrust and slide resistance can be reduced, and low vibration of the joint can be achieved.

Further, since the transverse cross section of the leg shaft 32 is substantially elliptical and the longitudinal cross section of the inner peripheral surface 12*a* of the inner ring 12 is the arc-shaped convex cross section as described above, the outer peripheral surface of the leg shaft 32 on the torque load side and the inner peripheral surface 12*a* of the inner ring 12 come into contact with each other in a narrow area close to point contact. Thus, a force to tilt the roller unit 4 is decreased, and stability of a posture of the roller 11 is improved.

The tripod member 3 is manufactured by using a steel material through main processes such as forging (cold forging)→machining (turning)→broaching of the spline 34→a heat treatment→grinding. In the grinding process, regions including both end portions in the major axis direction in contact with the inner ring 12 on the outer peripheral surface of the leg shaft 32 are ground. In the present embodiment, both the end portions in the major axis direction of the outer peripheral surface of the leg shaft 32 and the vicinity thereof are ground, and regions therebetween in the circumferential direction are not ground. That is, as illustrated in FIG. 5, ground surfaces 32*a* are formed at both the end portions in the major axis direction of the outer peripheral surface of the leg shaft 32, and the regions therebetween in the circumferential direction are non-ground regions that are not ground. In the illustrated example, the ground surfaces 32*a* are provided up to a distal end of the outer peripheral surface of the leg shaft 32. The ground surfaces 32*a* come into contact with the inner peripheral surface 12*a* of the inner ring 12.

Hereinafter, a projection 40 which is a characteristic configuration of the present invention will be described.

Figure 6:
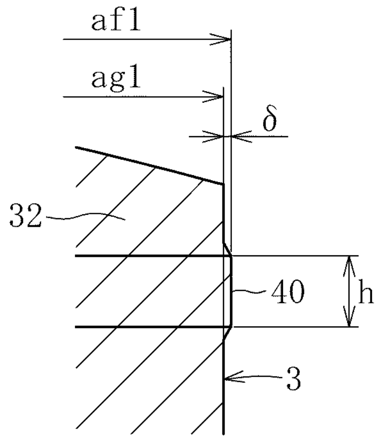
FIG. 6 is a cross-sectional view of a portion A in FIG. 5.

As illustrated in FIGS. 5 and 6, a projection 40 is provided on the outer peripheral surface of the leg shaft 32 of the tripod member 3. The projection 40 is provided on the outer peripheral surface of the leg shaft 32 on a shaft end side with respect to the inner ring 12. The projections 40 are provided in the regions including both the end portions in the major axis a direction on the outer peripheral surface of the leg shaft 32 (see FIG. 7). In the present embodiment, the projection 40 is provided on the ground surface 32*a* of the outer peripheral surface of the leg shaft 32, and is particularly provided in the entire area of the ground surface 32*a* in a leg shaft circumferential direction (the joint axial line O direction) (see FIG. 8). In the illustrated example, the projection 40 is provided on the ground surface 32*a* to be closer to the slightly proximal side (the center side of the tripod member 3) than the distal end of the leg shaft 32 (see FIG. 5). Therefore, the ground surfaces 32*a* are provided on both sides of the projection 40 in the leg shaft axial line P direction.

Figure 7:
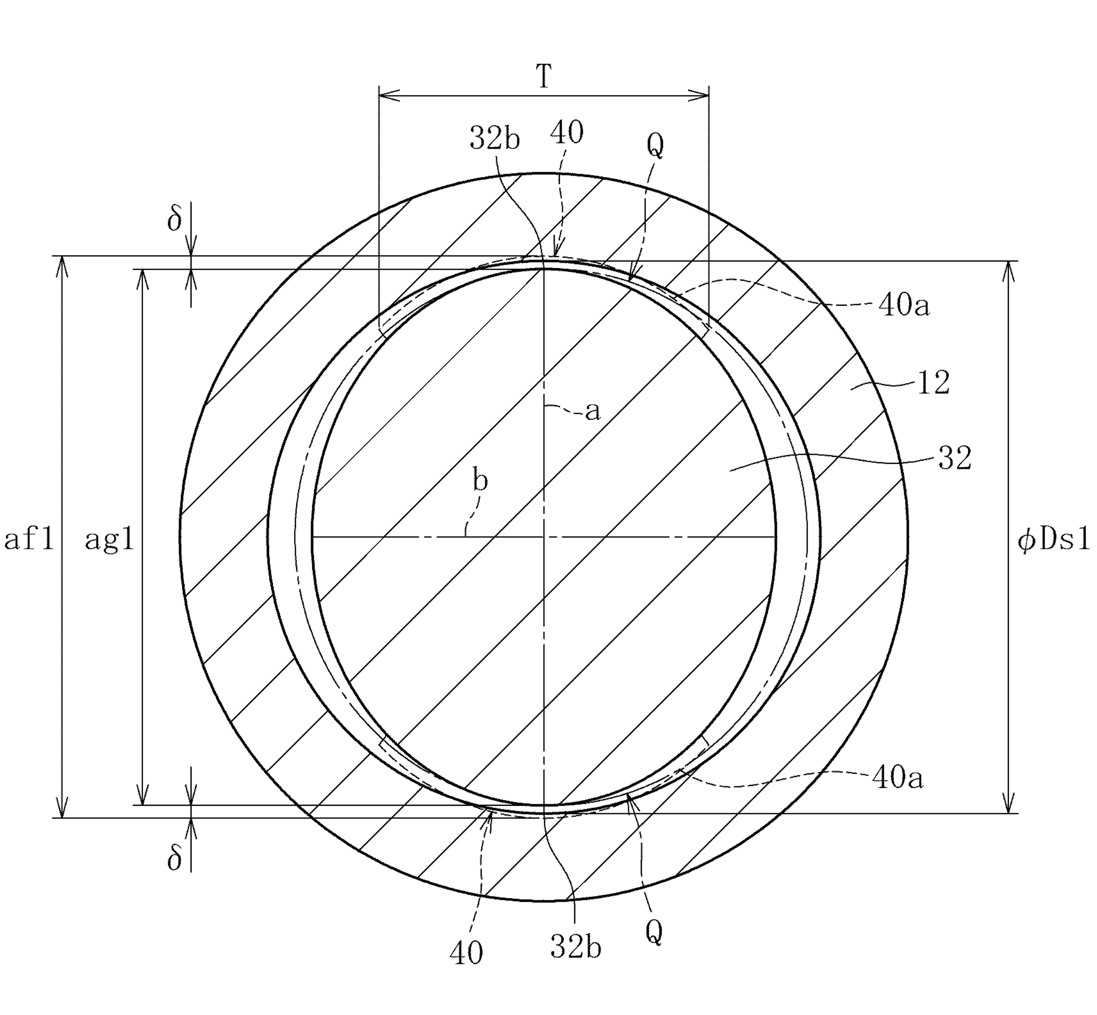
FIG. 7 is an enlarged cross-sectional view illustrating an inner ring and a leg shaft in FIG. 3.

As illustrated in FIG. 7, the projection 40 extends along the circumferential direction of the leg shaft 32. A ratio T/ag1 between a dimension T of the projection 40 in the joint axial line O direction and a dimension ag1 (that is, a major diameter of the transverse cross section of the leg shaft 32) of the leg shaft 32 in a direction orthogonal to the joint axial line O is 0.3 or more. For example, when the major diameter ag1 of the leg shaft 32 is 20 mm, the dimension T of the projection 40 in the joint axial line O direction is 6 mm or more. Note that the major diameter ag1 of the leg shaft 32 is measured in a region (the ground surface 32*a*) in contact with the inner ring 12. Further, the gap between the leg shaft 32 and the inner ring 12 and a projecting amount of the projection 40 are exaggerated in FIG. 7.

A projecting amount 6 of the projection 40 with respect to a region (the ground surface 32*a* in the illustrated example) adjacent in the leg shaft axial line P direction is constant in the circumferential direction and is set within a range of 0.015 to 0.15 mm. In this case, a difference (af1−φDs1) between a circumscribed circle diameter af1 of the projection 40 and a minimum inner diameter φDs1 of the inner ring 12 is 0.02 to 0.20 mm. A width h (see FIG. 6) of the projection 40 in the leg shaft axial line P direction is constant in the circumferential direction and is set within a range of 0.1 to 0.5 mm.

When the tripod type constant velocity universal joint 1 is assembled or repaired, when the tripod member 3 and the roller unit 4 are attached to or detached from the outer joint member 2, or when a drive shaft is attached to or detached from a vehicle, the inner ring 12 and the projection 40 of the leg shaft 32 interfere with each other, so that the removal of the roller unit 4 from the leg shaft 32 of the tripod member 3 is restricted. For example, when the leg shaft 32 is relatively moved in a direction of being pulled out from the inner periphery of the roller unit 4 in a state in which the leg shaft 32 and the roller unit 4 are coaxially disposed, a circumferential central portion of each of the projections 40 provided at both the end portions in the major axis a direction of the leg shaft 32 interferes with the inner peripheral surface of the inner ring 12 (see FIG. 7). At this time, the vicinities of both the end portions of each of the projection 40 in the circumferential direction are separated from the inner peripheral surface of the inner ring 12, and thus, there is no contribution to a retaining function.

Figure 8:
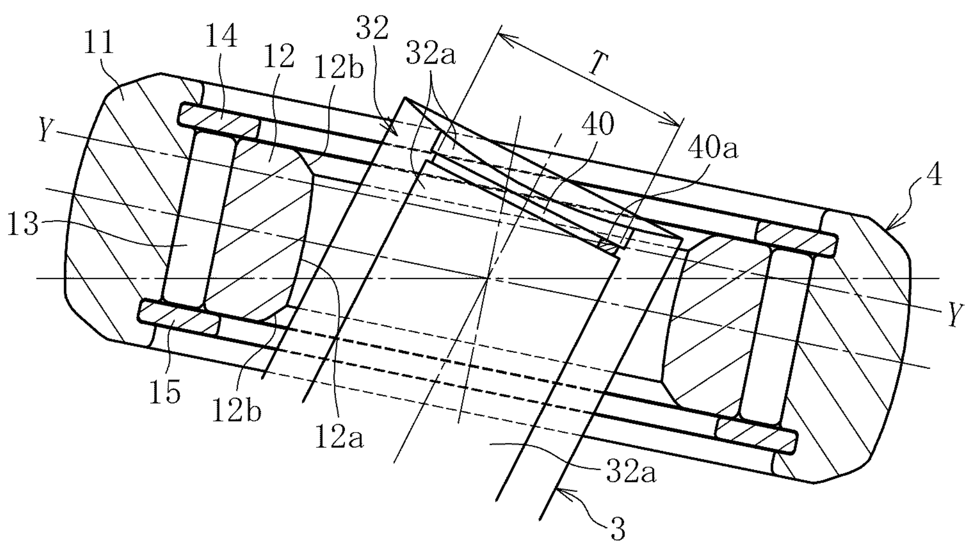
FIG. 8 is a cross-sectional view illustrating a state in which a roller unit tilts with respect to the leg shaft.

However, at the time of actual assembly or repair, and at the time of attaching and detaching the drive shaft to and from the vehicle, the leg shaft 32 and the roller unit 4 are hardly disposed coaxially, and are often brought into a state of tilting with respect to each other as illustrated in FIG. 8. In this case, a region 40*a* in the vicinity of one end portion in the circumferential direction of the projection 40 provided on the leg shaft 32 first interferes with the inner periphery of the inner ring 12. At this time, since the leg shaft 32 tilts with respect to the roller unit 4, a cross section (a cross section taken along line Y-Y in FIG. 8) of the leg shaft 32 in a direction orthogonal to a shaft center of the roller unit 4 extends in the minor axis b direction as indicated by a chain line in FIG. 7, and radii of curvature of maximum diameter portions 32*b* (both the end portions in the major axis a direction) of the leg shaft 32 increases. Further, when the leg shaft 32 tilts with respect to the roller unit 4, the traverse cross section of the leg shaft 32 is offset to one side (right side in the drawing) in the minor axis b direction with respect to the roller unit 4 as indicated by the chain line in FIG. 7. As a result, on the outer peripheral surface of the leg shaft 32 indicated by the chain line in FIG. 7, a region Q adjacent to one side in the circumferential direction (right side in the drawing) of the maximum diameter portion 32*b* is close to the inner peripheral surface of the inner ring 12.

In the tripod type constant velocity universal joint 1 according to the present invention, the projection 40 provided on the outer peripheral surface of the leg shaft 32 extends to a region that is conventionally considered not to interfere with the inner ring 12. Specifically, the dimension T of the projection 40 in the joint axial line O direction is larger than a width of the region where the leg shaft 32 and the inner ring 12 can interfere with each other in the state of being disposed coaxially. As described above, when the roller unit 4 tilts with respect to the leg shaft 32, the region Q adjacent to one side in the circumferential direction of the maximum diameter portion 32*b* of the outer peripheral surface of the leg shaft 32 is close to the inner peripheral surface of the inner ring 12, and thus, the region 40*a* in the vicinity of one end portion in the circumferential direction interferes with the inner peripheral surface 12*a* of the inner ring 12 first by extending the projection 40 in the circumferential direction (FIG. 8 illustrates an interference region by fine hatching). In particular, since the inner peripheral surface 12*a* of the inner ring 12 is the convex curved surface in the present embodiment, the region 40*a* in the vicinity of one end portion of the projection 40 in the circumferential direction easily interferes with the inner peripheral surface of the inner ring 12 earlier than the circumferential central portion.

Thereafter, when the leg shaft 32 is further relatively moved in the direction of being pulled out from the inner periphery of the roller unit 4, the interference region between the projection 40 and the inner ring 12 spreads toward the circumferential central portion of the projection 40. Since the dimension T of the projection 40 in the joint axial line O direction is set to be larger than a conventional one in consideration of the tilting states of the leg shaft 32 and the inner ring 12 as described above, it is possible to widen the interference region between the projection 40 and the inner ring 12 and enhance a retaining force of the roller unit 4 from the leg shaft 32.

On the other hand, when the roller unit 4 is assembled to the tripod member 3, the inner ring 12 is elastically deformed to climb over the projections 40 by pushing the roller unit 4 from the shaft end side of the leg shaft 32. At this time, when the inner ring 12 and the leg shaft 32 are assembled in the state of being disposed coaxially, only the circumferential central portion of the projection 40 of the leg shaft 32 interferes with the inner ring 12, so that it is sufficient that a pushing force of the roller unit 4 is similar with a conventional one. Therefore, the assemblability of the roller unit 4 with respect to the leg shaft 32 is not deteriorated even if a circumferential width of the projection 40 is increased.

Figure 9:
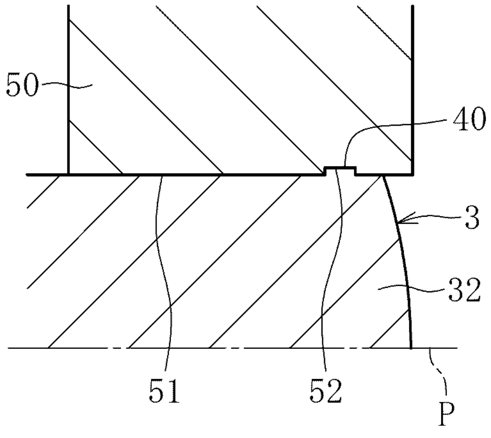
FIG. 9 is a cross-sectional view illustrating a grinding process of the leg shaft.
Figure 10:
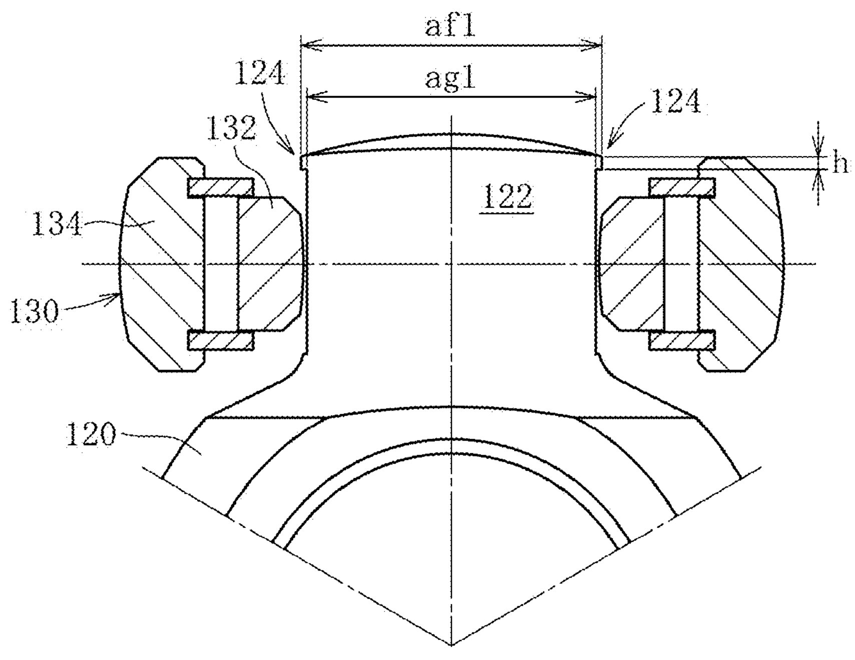
FIG. 10 is a cross-sectional view of a conventional tripod type constant velocity universal joint.
Figure 11:
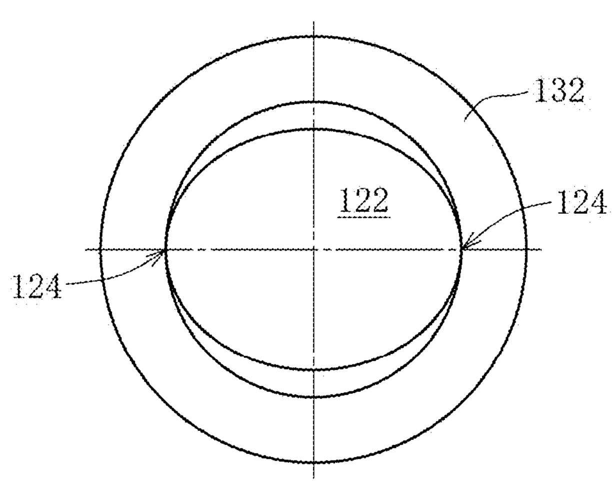
FIG. 11 is a cross-sectional view of an inner ring and a leg shaft of the constant velocity universal joint in FIG. 10.

The projection 40 can be formed by machining such as cutting or plastic working such as caulking. In the present embodiment, the projection 40 is ground simultaneously with the ground surface 32*a* provided on the leg shaft 32. Specifically, as illustrated in FIG. 9, a grindstone 50 is pressed against the outer peripheral surface of the leg shaft 32 while being relatively rotated with respect to the leg shaft 32, thereby performing grinding. The grindstone 50 is provided with a flat surface 51 and a groove portion 52. The ground surface 32*a* is formed on the outer peripheral surface of the leg shaft 32 by the flat surface 51 of the grindstone 50, and the projection 40 is formed by the groove portion 52. That is, not only the ground surface 32*a* of the leg shaft 32 but also an outer surface and a side surface of the projection 40 are surfaces ground by the grindstone 50. Since the projection 40 is ground simultaneously with the ground surface 32*a* as described above, manufacturing cost is reduced as compared with a case where the projection 40 is formed in a separate process. In this case, the projection 40 is provided in the entire circumferential area of the ground surface 32*a* of the leg shaft 32.

The tripod type constant velocity universal joint 1 described above is not limitedly applied to a drive shaft of an automobile, and can be widely used for power transmission paths of an automobile, industrial equipment, and the like.

REFERENCE SIGNS LIST

- 1 Tripod type constant velocity universal joint
- 2 Outer joint member
- 3 Tripod member
- 4 Roller unit
- 5 Track groove
- 6 Roller guide surface
- 8 Shaft
- 11 Roller
- 12 Inner ring
- 31 Body portion
- 32 Leg shaft
- **32*a*** Ground surface
- **32*b*** Maximum diameter portion

40 Projection
O Joint axial line
P Leg shaft axial line
T Dimension of the projection in the direction of the joint axial line
ag1 Dimension of the outer peripheral surface of the leg shaft in the direction orthogonal to the joint axial line

The invention claimed is:

1. A tripod type constant velocity universal joint comprising:

an outer joint member in which track grooves extending in an axial direction are formed at three locations in a circumferential direction;

a tripod member which has three leg shafts projecting in a radial direction; and a roller unit rotatably supported by each of the leg shafts and accommodated in each of the track grooves, the roller unit including a roller, and an inner ring that is externally fitted to the leg shaft and rotatably supports the roller, the inner ring having an inner peripheral surface formed as a convex curved surface in which an intermediate portion in an axial line direction of the inner ring projects toward an inner diameter side, the inner peripheral surface of the inner ring coming into contact with an outer peripheral surface of the leg shaft in a direction orthogonal to a joint axial line and forming a gap against the outer peripheral surface of the leg shaft in a direction of the joint axial line, wherein a projection is provided in regions including both end portions in a direction orthogonal to the joint axial line on a shaft end side with respect to the inner ring on the outer peripheral surface of the leg shaft, and a ratio T/ag1 between a dimension T of the projection in the direction of the joint axial line and a dimension ag1 of the outer peripheral surface of the leg shaft in the direction orthogonal to the joint axial line is 0.3 or more.

2. The tripod type constant velocity universal joint according to claim 1, wherein a ground surface is provided in a region including both end portions in the direction orthogonal to the joint axial line on the outer peripheral surface of the leg shaft, and the projection is provided in an entire area of the ground surface in the direction of the joint axial line.

3. The tripod type constant velocity universal joint according to claim 1, wherein a projecting amount of the projection is 0.015 to 0.15 mm in an entire area of the projection in the direction of the joint axial line.

4. The tripod type constant velocity universal joint according to claim 1, wherein a width of the projection in a leg shaft axial line direction is 0.1 to 0.5 mm in an entire area of the projection in the direction of the joint axial line.

* * * * *